US008352303B2

(12) United States Patent
Lehmann et al.

(10) Patent No.: US 8,352,303 B2
(45) Date of Patent: Jan. 8, 2013

(54) COMPUTER IMPLEMENTED METHOD FOR INTEGRATING SERVICES IN A CALENDAR APPLICATION VIA MEETING REQUEST E-MAILS

(75) Inventors: Jens Lehmann, Wiesloch (DE); David Sommer, Bruehl (DE)

(73) Assignee: SAP AG, Walldorf (DE)

( * ) Notice: Subject to any disclaimer, the term of this patent is extended or adjusted under 35 U.S.C. 154(b) by 159 days.

(21) Appl. No.: 12/623,759

(22) Filed: Nov. 23, 2009

(65) Prior Publication Data
US 2011/0125545 A1    May 26, 2011

(51) Int. Cl.
*G06Q 10/00*    (2012.01)

(52) U.S. Cl. .................. 705/7.19; 705/7.18; 705/14.53; 705/39; 705/5; 709/206; 715/202; 715/211; 715/751; 715/764; 718/100; 706/11

(58) Field of Classification Search ................. None
See application file for complete search history.

(56) References Cited

U.S. PATENT DOCUMENTS

| | | | | |
|---|---|---|---|---|
| 4,626,836 A | * | 12/1986 | Curtis et al. ............... | 345/156 |
| 5,070,470 A | * | 12/1991 | Scully et al. ............... | 708/112 |
| 6,363,352 B1 | * | 3/2002 | Dailey et al. ............... | 705/7.19 |
| 6,388,772 B1 | * | 5/2002 | Williams ..................... | 358/448 |
| 7,082,402 B2 | * | 7/2006 | Conmy et al. .............. | 705/7.19 |
| 7,974,849 B1 | * | 7/2011 | Begole et al. ............... | 705/1.1 |
| 2001/0014866 A1 | * | 8/2001 | Conmy et al. .............. | 705/9 |
| 2001/0014867 A1 | * | 8/2001 | Conmy ........................ | 705/9 |
| 2002/0016729 A1 | * | 2/2002 | Breitenbach et al. ....... | 705/9 |
| 2003/0004772 A1 | * | 1/2003 | Dutta et al. ................. | 705/8 |
| 2003/0040946 A1 | * | 2/2003 | Sprenger et al. ........... | 705/6 |
| 2003/0204474 A1 | * | 10/2003 | Capek et al. ................ | 705/64 |
| 2004/0039630 A1 | * | 2/2004 | Begole et al. ............... | 705/11 |
| 2004/0167877 A1 | * | 8/2004 | Thompson, III ............ | 707/3 |
| 2005/0033614 A1 | * | 2/2005 | Lettovsky et al. ........... | 705/5 |
| 2005/0154620 A1 | * | 7/2005 | Hentschel et al. .......... | 705/5 |
| 2005/0193011 A1 | * | 9/2005 | Peebles et al. .............. | 707/104.1 |
| 2005/0262164 A1 | * | 11/2005 | Guiheneuf et al. .......... | 707/203 |
| 2006/0106655 A1 | * | 5/2006 | Lettovsky et al. ........... | 705/6 |
| 2006/0155591 A1 | | 7/2006 | Altaf et al. | |
| 2006/0206363 A1 | * | 9/2006 | Gove ............................ | 705/6 |
| 2006/0276960 A1 | | 12/2006 | Adamczyk et al. | |
| 2007/0033103 A1 | * | 2/2007 | Collins et al. ............... | 705/14 |
| 2007/0143412 A1 | * | 6/2007 | Qi ................................ | 709/206 |
| 2007/0260591 A1 | | 11/2007 | Ahi et al. | |
| 2009/0031232 A1 | * | 1/2009 | Brezina et al. .............. | 715/764 |
| 2009/0083229 A1 | * | 3/2009 | Gupta .......................... | 707/3 |
| 2009/0327169 A1 | * | 12/2009 | Kamar et al. ............... | 706/11 |

OTHER PUBLICATIONS

Tsai, J.. (Feb. 2008). Re:Tooling. Customer Relationship Management, 12(2), 46.*
Neustaedter, C.. Domestic awareness and the role of family calendars. Ph.D. dissertation, University of Calgary (Canada), Canada.*

(Continued)

*Primary Examiner* — Gurkanwaljit Singh
(74) *Attorney, Agent, or Firm* — Kenyon & Kenyon LLP

(57) ABSTRACT

The invention relates to a method for integrating services in a calendar application via the meeting request functionality of calendar programs comprising:
  initiating one or multiple services, wherein the initiation may involve the transmission of calendar event information from the calendar application to the service, the service requests being sent as meeting request e-mails to one or more service e-mail addresses, each service e-mail address representing a service,
  receiving the update requests generated by the one or multiple services, the update requests being meeting request response e-mails or one or multiple second meeting request e-mails
  processing the received update requests, and
  updating the calendar application.

14 Claims, 7 Drawing Sheets

OTHER PUBLICATIONS

Mitchell H Goldstein. (Jul. 1986). Focus/Office Automation :Project Management Systems. National Productivity Review (1986-1998), 5(3), 290.*

Liu, R.. Essays in collaborative supply chains: Information sharing, event management and process verification. Ph.D. dissertation, The Pennsylvania State University, United States—Pennsylvania.*

Tullio, Joseph C. (2005). Exploring the design and use of forecasting groupware applications with an augmented shared calendar. Ph.D. dissertation, Georgia Institute of Technology, United States—Georgia.*

* cited by examiner

COMPUTER IMPLEMENTED METHOD FOR INTEGRATING SERVICES IN A CALENDAR APPLICATION VIA MEETING REQUEST E-MAILS

FIELD OF THE INVENTION

The present invention relates to the field of data processing, and more particularly to a computer implemented method for integrating services in a calendar application via meeting request e-mails.

BACKGROUND AND RELATED ART

Calendar applications are software applications comprising an electronic calendar. In addition to providing a calendar functionality, calendar applications may assist in managing events and dates, may comprise address books and integrated e-mail clients. They assist in organizing meetings by providing a meeting request functionality for inviting multiple persons to meetings and telephone conferences. Microsoft Outlook, for example, provides the user with means to invite one or more potential participants to join a meeting via a meeting request e-mail sent to the e-mail addresses of the invited persons. The user sending the meeting request e-mails is in the following referred to as the organizer of the meeting.

A core limitation of current calendar applications is the fact that they are decoupled from the events of the real world they are supposed to help organizing. If an event or an activity other than a meeting event, e.g. a trip event, has to be postponed or modified, these changes usually have to be entered in the calendar application manually. The multitude of manual steps which have to be exercised in order to synchronize the events in the electronic calendar with the events in the real world costs considerable time and effort and may lead to errors. In addition, many tasks have to be manually exercised repeatedly, e.g. the booking of train tickets, the booking of a table in a restaurant or the search for trip accompanies with the help of a trip sharing service. In particular for uniformly executed, repeated tasks, the automated execution of the corresponding services and an automated synchronization of the service with the calendar application would highly be appreciated by many users of calendar applications.

In the following, the term 'event' being stored in, written to or read from an electronic calendar of a calendar application refers to data objects representing an event in the real world. The data object comprises data being adapted to specify an event, for example, but not limited to, starting time, ending time, location or the subject. The data object can be manipulated by the commands of a programming language.

As the calendar applications currently used are not able to communicate with services related to trip events and business appointments automatically, the user currently fulfils the function of a human interface between the calendar application and the services: the user has to remember multiple passwords, log into multiple services in order to book flights, order taxies or buy train tickets. While the user exercises a task, e.g. buys a train ticket, he is notified about the actual departure and arrival time of the chosen connection. This information in the next step has to be entered by the user in the electronic calendar manually.

The tasks mentioned in the previous examples commonly and repeatedly occur in business as well as private life but currently no adequate solution exists to execute them automatically, thereby saving working time, preventing the introduction of errors and ensuring that the electronic calendar is up-to-date, synchronized with the real world and free of inconsistencies.

SUMMARY OF THE INVENTION

The present invention provides a computer implemented method for integrating one or multiple services in a calendar application via the meeting request (MR) functionality of the calendar application. A particular advantage of that method is that no additional software component has to be installed in order to integrate remote services into a calendar application. The presented method can be used to integrate services into any calendar application comprising a meeting request e-mail functionality, e.g. Microsoft Outlook, Apple iCal, Mozilla Thunderbird, Google Calendar, Blackberry Calendar, Lotus Notes, the iPhone Calendar and many more. A meeting request functionality of a calendar application is a function by which users can invite one or multiple other persons to a meeting, the meeting being defined by a starting time, location and ending time. Each invited person may accept, postpone or reject a meeting invitation by sending a meeting request response (MRR) e-mail to the e-mail address of the organizer. In case an invited person accepts the suggested meeting date, the event in the electronic calendar of the organizer corresponding to the MR for the meeting is automatically updated with the information that the invited participant will join the meeting.

Each invited person may accept the appointment, reject it or propose a new time. The invited user submits his decision to the calendar application of the organizer by clicking on an 'accept', 'reject' or 'suggest new time' button displayed by the calendar application of the invited person after opening the meeting request (MR) e-mail. In case the 'suggest new time' button is selected, the invited user in addition has to specify a new proposed time. After the invited user has reached a decision and clicked the corresponding button, a meeting request response (MRR) e-mail is sent automatically or upon confirmation to the organizer, resulting in an automated update of the calendar event in the organizers' electronic calendar corresponding to the meeting request. The update of the electronic calendar in the described use case scenario comprises the confirmation or decline of the meeting event planned by the organizer or the marking of the meeting event with the information that the event should be shifted to another time. In most current calendar applications, it is possible to submit more information than said three options 'accept', 'decline' or 'propose new time', e.g. by adding comprehensive supplementary data or comments to the MRR e-mail in the e-mail's text body. However, due to security considerations, this additional data is not added to the calendar event in the organizer's calendar. This current limitation regarding the update functionality of calendar applications has been established for security reasons in order to ensure that the organizer is the only user being allowed to edit the invitation text in the text body of a calendar event corresponding to a MR. For said reasons, the options for automatically updating electronic calendars via a MRR are currently restricted to a limited set of parameters. An invited meeting participant receiving an MR e-mail who, for example, wants to explain in a paragraph of text why he will not be able to join the meeting at the requested time or wants to add supplementary information, e.g. some topics he wants to discuss in the meeting, cannot simply add this information to the event in the electronic calendar of the organizer or the other meeting participants e.g. by adding this additional data to the text body of the MRR e-mail. If he wants to provide all other participants and the organizer with said additional data, he has to write a second e-mail. He may write this second e-mail in the form of a second MR e-mail sent to all recipients of the first MR e-mail and the organizer. As the invited user is the organizer of the second MR e-mail, he may add the data he considers as being relevant to the text body of the second meeting request e-mail. By sending this second meeting request e-mail to the list of recipients, the electronic calendars of the recipients are automatically or upon confirmation updated, because the receipt of the second MR e-mail will trigger the creation of new events.

Other calendar applications following a less restrictive security policy than e.g. Microsoft Outlook or Lotus Notes are more permissive regarding the possibility to update events via MRR e-mail of invited users. In order to update those calendar applications, the submission of a second MR e-mail by a recipient of the first MR is not required. Rather, the recipient of the first e-mail is able to provide all other invited persons and the organizer with additional relevant data simply by adding said data directly e.g. to the text body or another field of the first MRR e-mail. If the calendar applications of the recipients follow a permissive updating policy, the additional data provided in the first MRR e-mail will automatically be added to the existing MR related event in their respective electronic calendars.

In the following, the updating of the organizer's electronic calendar regarding said limited list of options ('accept', 'decline', 'propose new time') via a first MRR e-mail in combination with creating a new event in the organizer's calendar by sending a second MR e-mail (from the recipient of the first MR to the organizer of the first MR) will be referred to as 'default updating strategy'. The second MR e-mail comprises additional data and may also comprise modified event specifications. The specifications of an event can comprise a time information, e.g. the starting time or ending time, but can in addition or alternatively also comprise information such as location, subject, a recurrence pattern for recurring events and additional information required by a recipient, the additional information being contained in the text body of the event.

A second 'advanced updating strategy' does not require the submission of the second MR e-mail, because according to this update strategy all additional data can be provided already within the MRR e-mail. The advanced updating strategy requires the calendar application of the organizer and other participants of the event to follow a permissive security strategy: the calendar application must allow the update of any kind of information of a calendar event, e.g. starting time, ending time, location or the text contained in the text body of the event).

The term update request (UR) will in the following refer to the submission of e-mails from an invited MR participant to the organizer of the first MR, wherein the e-mail may be one single MRR e-mail or a combination of a MRR e-mail and a second MR e-mail.

The update request may comprise the submission of a first MRR-email and a second MR e-mail to the organizer's e-mail address, the first MRR updating only a limited list of options of the event associated with the first MR, the second MR e-mail updating the organizer's electronic calendar by creating a second event. The second event comprises all the additional data and optionally modified event specifications. Said updating strategy is in the following referred to as 'default updating strategy'.

The update request may also comprise the submission of only a first MRR-email to the organizer's email address, the first MRR e-mail being able to update any kind of data specifying the event associated with the first MR, e.g. time and location and being able to add supplementary data to the event corresponding to the first MR e-mail. Said updating strategy is in the following referred to as 'advanced updating strategy'.

Which kind of updating strategy is applicable in the context of a particular use case scenario depends on the implementation and security policy of the calendar applications used by the meeting request participants, in particular, the organizer.

Due to the fact that in praxis many calendar applications for security reasons do not provide the full update functionality they could provide, the present invention follows a dual strategy for automatically integrating services into calendar applications via the MR and MRR functionality provided by current calendar applications.

The invention according to a preferred embodiment comprises the steps of sending service requests (SR) to one or multiple services in the form of meeting request e-mails. The meeting request (MR) e-mails are sent from the organizer's e-mail address to an e-mail address representing a service. After receiving the meeting request e-mail, each service processes and evaluates the e-mail.

According to an embodiment of the invention directed to users of calendar applications with permissive security policy, the 'advanced updating strategy' is applied: the service, after receiving and processing the received MR e-mail, executes the service-specific processing steps. The results of these processing steps are returned in the form of a first meeting request response (MRR) e-mail to the sender e-mail address of user of the calendar application. This first MRR e-mail comprises additional data being the result of the execution of the service. The additional data may be contained within the text body of the MRR e-mail. The MRR e-mail may also comprise a modification of the data specifying the corresponding event in the organizer's electronic calendar, e.g. starting time, ending time, subject line and other data. Upon receipt of the MRR e-mail by the organizer's calendar application, the event in the electronic calendar corresponding to the first MR e-mail is updated and may now comprise additional information and/or may be characterized by a modified starting time or location.

According to a further embodiment of the invention being adapted for users of current calendar applications following a strict security policy, the 'default updating strategy' is applied: the service, after receiving and processing the received MR e-mail, returns a first meeting request response (MRR) e-mail to confirm the receipt of the MR e-mail. This e-mail may comprise the status information 'acceptance'. The first MRR e-mail may, alternatively, comprise 'decline' information, e.g. in case the service is currently not available or for other reasons not able to process the request. Said limited update options are sent via the first MRR e-mail to the calendar e-mail address of the organizer, resulting in an update of said options in that event in the organizer's electronic calendar that corresponds to the first MR e-mail. In the next step, the service processes the request. The results of these processing steps are returned in the form of a second meeting request (MR) e-mail to the organizer's e-mail address. The submission of the second MR e-mail by the service is decoupled from the submission of the first MRR e-mail. Depending on the service, the processing of the service may be finished immediately after receiving the request or may last for multiple days. The processing may also comprise the regular execution of condition checks on data provided by the MR e-mail until the condition is fulfilled. If a result could be obtained by the execution of the service, the result is returned to the organizer's and the participants' e-mail addresses via a second MR e-mails. The second MR e-mail comprises additional data e.g. within the text body of the second MR e-mail, the data being the result of the execution of the service, e.g. within the text body of the second MR e-mail. The second MR e-mail may also comprise a modified event specification, e.g. a different starting or ending time or a different location. The receipt of the second MR by the organizer's calendar results in an update of the electronic calendar: a new calendar event corresponding to the event specifications of the second MR e-mail is created, the new event optionally comprising additional data also provided by the second MR e-mail.

A further embodiment of the invention comprises a remote service returning only binary data, e.g. yes or no ('accept' or 'decline'). In this case, the submission of the second MR e-mail by the service is obsolete even in case the calendar application of the organizer follows a restrictive security policy. In this case, the service is executed immediately after receiving the first MR e-mail and the first MRR e-mail is returned after the processing of the service request. The 'accept' or 'decline' options of the first MRR e-mail depend on the results generated during processing the service request.

According to a preferred embodiment of the invention, the services are hosted on servers being accessible via a network connection, e.g. the Internet or an Intranet of a company, a LAN or a WAN. The meeting request e-mails may comprise additional data associated with a calendar event, the data being required for the execution of the service.

According to one embodiment of the invention, the client machine running the calendar application does not require any software in addition to the calendar application in order to call one or multiple services provided that the calendar application is operable to send meeting request e-mails and receive meeting request response e-mails. In this case, the user has to specify a new meeting request e-mail for inviting services analogously to the specification of meeting request e-mail for organizing meetings. The specification of an event or a meeting request e-mail comprises the creation of an calendar event or a meeting request e-mail and specifying characteristic parameters of the created event or e-mail instance, e.g. starting time, ending time, location, subject and the recipient's email address(es). Instead of or in addition to inviting persons and entering the persons e-mail addresses, the user invites one or multiple services by entering service e-mail addresses in the recipients field. Depending on the called service, the location, starting time, subject or text body fields of the meeting request e-mail may be used by the organizer to supplement the meeting request e-mail with additional data required by the called service for execution. The server hosting the called service monitors the mailbox of the service e-mail address for incoming meeting request e-mails. The meeting request e-mails are opened by the service and the required data, e.g. sender, title of the e-mail, location and time information of the requested meeting is read and used as input for the service. Depending on the updating strategy of the embodiment of the invention, a first confirmation MRR e-mail may be sent to the organizer's e-mail address or the service may be executed immediately. After finishing the processing of the service request, each service returns its results in the form of an meeting request response e-mail ('advanced updating strategy') or via a second meeting request e-mail ('default updating strategy') to the sender e-mail address of the user of the calendar application. The first MRR e-mail and/or the second MR e-mail are received by the calendar application of the sender/organizer. As a result, the calendar event corresponding to the first MR e-mail ('advanced updating strategy') is automatically updated, or a new, second calendar event corresponding to the specifications of the second MR e-mail is created ('default updating strategy'). The updating may comprise adding additional information to the event, e.g. a confirmation on the successful booking of a ticket if one of the called services was a ticket booking service. The updating may also comprise a postponement or cancelation of the event.

A core advantage of this form of integrating services into calendar applications is that no additional software has to be installed by the user. Provided, the calendar application is installed and able to submit meeting request e-mails to a service e-mail address and the service is operable to receive and process the first MR e-mail and to return the results in the form of first MRR e-mails or second MR e-mails, the user may take advantage of any existing service and integrate it into any calendar application simply by submitting an MR to the service e-mail address of the service. Said implementation is therefore independent of the type of the calendar application used and independent of the operating system of the machine on which the calendar application is installed. It is merely required that the service hosted e.g. on an external server is operable to receive and process meeting request e-mails and return a meaningful result in the form of a first MRR e-mail or a second MR e-mail.

The seamless integration of services into calendar applications according to preferred embodiments of the present invention reduces the number of tasks a user has to execute manually in order to organize a trip or an appointment. The term trip and travel will in the following be used synonymously. Embodiments of the present invention render many manual update steps unnecessary as the update requests returned by the services are used to automatically or upon confirmation update the calendar application, thereby also reducing possible sources of error.

According to a further embodiment of the invention, a calendar application dependent software component is used to predict required events and actions by evaluating events already existing within the electronic calendar of the calendar application. This software component requires read and write access to the data of the electronic calendar and depends on the implementation of the used calendar application program. The prediction of the necessity to invite one or multiple services in dependence of existing events within the calendar further reduces the number of required manual actions having to be performed by the user in order to organize the events in his calendar application. It is 'calendar application dependent', because its implementation details depend on the type of the calendar application the software component interacts with, e.g. Microsoft Outlook or Lotus Notes.

According to a further embodiment, the specification of locations within a service request (SR) by a user is facilitated by a process of replacing tags by unequivocal addresses. Unequivocal address information is required by many services in the context of appointment and trip management, e.g. for calculating the distance between two locations and for estimating the required travel time. The entry of those unequivocal addresses is, however, time consuming, as most people memorize only a very limited number of complete addresses including street, house number and postal code. Usually, people use the names of persons, buildings or activities when referring to particular places, e.g. 'Mike', 'Mr. Peters', 'the Pentagon', 'Home' or 'Work'.

According to said embodiment of the invention, the user is allowed to enter said ambiguous names 'Mike' or 'Home' in order to refer to an unequivocal address including street, house number and postal code. The ambiguous tags are mapped to unique addresses, the addresses being used in further processing steps. In contrast to complete address blocks, those tags can be entered by the user very quickly and conveniently. It is possible, for example, to specify a route by entering 'from Mike to Tom' or 'from Home to Work'. In order to calculate the route to get from one person to the other, e.g. by a route planning service, those tags have to be mapped to the complete address of each person. As the name 'Mike' may, depending on the user, denominate different persons located in different places, a personalized, user-specific mapping and tag replacement has to take place. In order to calculate a route based on location tags contained in one or multiple fields of a first MR e-mail, a personalized mapping schema specifying to which address the name 'Mike' has to be mapped is required. The personalized mapping information may be provided as additional information within the service request e-mail or may be a part of a user profile available to the service. The mapping may also comprise the mapping of general terms and names to unequivocal addresses, e.g. 'Pentagon'. The process of mapping also comprises a text analysis step in which token boundaries are determined, in which some of the tokens are recognized by the service as tags representing unequivocal addresses and wherein regular expressions may be applied in order to identify location tags.

According to a further embodiment of the invention, the mapping of location tags to unequivocal addresses also comprises the mapping of tags to routes. According to this use case scenario, the meeting request e-mail may comprise, e.g. in its location field, one single tag representing a route rather than two location tags representing the starting point and destination. For example, the tag 'Highway' could represent the route from 'Work' to 'Home' via the highway, while the tag 'Countryroad' may refer to an alternative route from 'Work' to 'Home'. The required mapping information is derived, according to one embodiment, from a list of 'favorite routes' being contained in a user's profile. Alternatively, the mapping information could be specified within a text field of the meeting request e-mail.

The process of tag resolution may be executed on the client side, if the calendar application dependent software module is operable to exercise the text analysis and personalized tag mapping. According to a further embodiment of the invention, the address book of the calendar application being locally available to the calendar application dependent software module can be used for the task of personalized tag mapping: in order to map the tag 'Mike' to an unequivocal address, the contact list of the calendar is searched for an entry comprising 'Mike' in one of the name fields. In case there exists only one 'Mike' entry in the contact list, the address block of this entry can be used for the mapping process. In case multiple entries comprising 'Mike' in their name fields exist, the user is asked, e.g. via a dialog window, which of the found addresses should be mapped to the 'Mike' tag. According to a further embodiment of the invention, the decision of the user is memorized by the calendar application dependent software module in a 'mapping history'. In this case, the user is required to execute the selection step only once when the 'Mike' tag is used the first time. In all subsequent tag mapping processes, the mapping history is used to resolve a tag automatically.

The tag mapping according to a further embodiment of the invention may also be exercised on a server hosting a mapping service. In this case, the server must be able to analyze the text of the received meeting request e-mail, and must have access to the personalized mapping information required for tag replacement. According to a preferred embodiment, the tag replacement and corresponding text processing steps are adapted for the English language, but other languages can be supported by other embodiments of the invention as well.

According to a further embodiment of the invention, here referred to as 'explicit meeting request specification', the user has to explicitly and manually determine and specify required events and corresponding meeting request e-mails given the context of existing events in the calendar application. The user may, for example, specify a trip event by creating a meeting request e-mail. A trip event is an entry in an electronic calendar representing a trip. The e-mail is sent to one or multiple services assisting in the organization of the trip. According to said embodiment, it is the task of the user to specify the trip, wherein the specification comprises determining the departure and arrival time and additional data required by the services to be called. Further embodiments of the invention may provide services for booking tickets for trains or concerts, for ordering tables in restaurants, for booking conference rooms and for ordering overhead projectors and other presentation devices for the conference room. There user may send a meeting request to a table ordering service of a restaurant in order to book a table for a business lunch or a meeting request to a presentation device service managing the devices of a company for organizing a presentation in a conference room.

A practical use case scenario of described approach would be the invitation of a conference equipment service run by a company to each meeting held by an employees of the company. The service could reserve and allocate required devices, e.g. microphones, video projectors or laser pointers, to a particular meeting. The service could be invited to every meeting in various different ways. For example, the employees of the company could be instructed to add the service's e-mail address on the recipients field of each sent meeting request e-mail. In order to ensure that the user does not forget to do so, it is also be possible, e.g. in case Microsoft Outlook is used as calendar application, to define rules for each employee's calendar application, the rules adding the service's e-mail address to the list of recipients automatically on each submission of a meeting request e-mail. Alternatively, it would also be possible to define a rule on the Outlook exchange server, the rule adding the service address to the list of recipients e-mail addresses to each specified meeting request e-mail.

According to a further embodiment of the invention, here referred to as 'implicit required event prediction', the determination of required events, e.g. required trip events to get from one meeting to another, is based on knowledge which is implicitly contained in the calendar application. Other than the explicit event specification, this approach does not require the user to explicitly specify meeting request e-mails in order to call a service assisting in organizing a corresponding event. Depending on the embodiment of the invention, the prediction of implicit required events may be implemented as an additional remote service or as an integral part of the calendar application dependent software component located on the client side.

A further embodiment of the invention comprises an implicit required event prediction on the client side. The calendar application dependent software module in operation analyzes a first event within the calendar application given the context of other events in the electronic calendar being in temporal proximity to the first event. According to a further embodiment of the invention, the implicitly predicted event is a trip, the trip being required to get from one event scheduled in the electronic calendar to the other. After having predicted a required event, e.g. a required trip event to get from one meeting to the next, the calendar application dependent software component executing said implicit required event prediction method automatically calls an appropriate service via a meeting request e-mail in order to organize the event or execute any other task related to this event. This scenario is especially advantageous if the quality of the prediction is high enough for the user to completely rely on the output of the prediction. According to further embodiments of the invention, the software component 314 is capable of estimating the accuracy of the prediction of the required event based on the number of positive confirmations of predictions of required events of a particular type in the past.

Depending on the embodiment of the invention, the prediction of required trip events may be executed after the user has entered a new event or on a regular basis. The prediction may be executed for a newly entered event in the context of other events lying in temporal proximity to this event, it may be executed for all events within a calendar or for any other sub-set of events defined according to other criteria.

According to a further embodiment of the invention, the required events predicted according to the implicit required event prediction method by the calendar application dependent software module are displayed to the user. The sending of meeting request e-mails according to this embodiment is delayed until the user has approved to the predicted required events. The question, if a an approval by the user is required before services associated with the predicted required events are called, may also depend on user defined settings.

According to a further embodiment of the invention, the plug-in is operable to exchange data with remote services e.g. via web services, CORBA, remote procedure calls or the like to receive user profile data from the remote service required for predicting required evens locally. If the user has specified in his user profile a time margin to be added to each predicted trip in order to be sure not to arrive late at a meeting, this time margin information could be received by the plug-in via accessing user profile data stored remotely on by the host of the service.

Further embodiments of the invention comprise the integration of services for recurring events via meeting request e-mails.

According to a further embodiment of the invention, the implicit required event prediction is executed on the server side. According to this application scenario, the specifications of all events being of relevance for the prediction of the required event have to be contained in a meeting request E-Mail sent to the service. The number and type of the events being of relevance depends on the type of the service used for predicting required events. For example, a service for predicting long distance travels could require the received meeting request e-mail to comprise time and location information of a new event and additional events being scheduled at maximum two weeks before or after the new event. If the service is a service for ordering a taxi for short trips, this service may require the meeting request e-mail to comprise only a new event and additional events starting a few hours before or after the new event and being in addition located in the same town. The criteria used to select a subset of relevant events from the calendar application being submitted to a service for implicitly predicting required events on the server side therefore strongly depends on the called service. The service analyses the received meeting request e-mail and uses the event information contained therein to predict additional required events. In case one or multiple required events could be predicted by the service, a meeting request e-mail is returned to the calendar application, the meeting request comprising data specifying the time, location or other features of the predicted required event(s).

According to a further embodiment of the invention, the implicit required event prediction is also executed on the server side. However, the specifications of all events being of relevance for the prediction of the required event are not sent by one meeting request E-Mail to the service. Rather, each event created in the calendar application is sent e.g. in the form of a meeting request e-mail, to the server, resulting in a duplication of the electronic calendar on the server side. The implicit required event prediction service hosted on the server may execute the event prediction routines on a regular basis or upon receipt of each new meeting request e-mail. If, according to this scenario, the server predicts a new required event, the specifications of that event (time, location, additional data) are sent in the form of a meeting request e-mail to the client machine.

According to a further use case scenario, the server has access to the electronic calendar of the client to scan the electronic calendar for required events.

The integration of services via meeting request e-mails is advantageous as the user does not have to install any software in addition to the calendar application. Merely the service provider is required to provide a service which can be initialized by the receipt of a meeting request e-mail sent to a service e-mail address representing the service. The service must be operable to interpret and process meeting request e-mails and must be operable to return an update request to the calendar application in the form of a MRR e-mail or a second MR e-mail. The communication between the client running the calendar application and the server hosting this service is according to this use case scenario confined to the exchange of e-mails. Second or third order services called by the first order service may be called via any available communication technology, e.g. web services, CORBA, remote procedure calls or the like.

In case the user has created a user profile for a called service, the processing of a meeting request by the service may also comprise the step of associating a service request to an existing user profile, e.g. based on a matching of the e-mail address of the service request and the e-mail address of the user-profile. Information contained within this user-profile may be used by the service during the processing of the service request.

According to a further embodiment of the present invention, the called service is a trip sharing service which can be called and be seamlessly integrated to a current calendar application via the meeting request e-mail functionality of a calendar application. This trip sharing service provides the user with the possibility to automate and facilitate the organization of shared trips. For example, the entry of a new meeting in the electronic calendar of the calendar application may be sent to the trip sharing service in the form of a meeting request e-mail to search for appropriate trip accompanies. The service processes the request and returns an update request, in the form of a first MRR e-mail or a second MR e-mail.

Said seamless integration of the trip sharing service into current calendar applications is only one example for the integration of a service to a calendar application via the submission of meeting request e-mails to service e-mail addresses of remote services. It shall be explicitly stated here that, based on the presented approach, any kind of service may be integrated to a calendar application.

BRIEF DESCRIPTION OF THE DRAWINGS

In the following, embodiments of the invention are described by way of example, only making reference to the drawings in which.

DETAILED DESCRIPTION

Figure 1A:
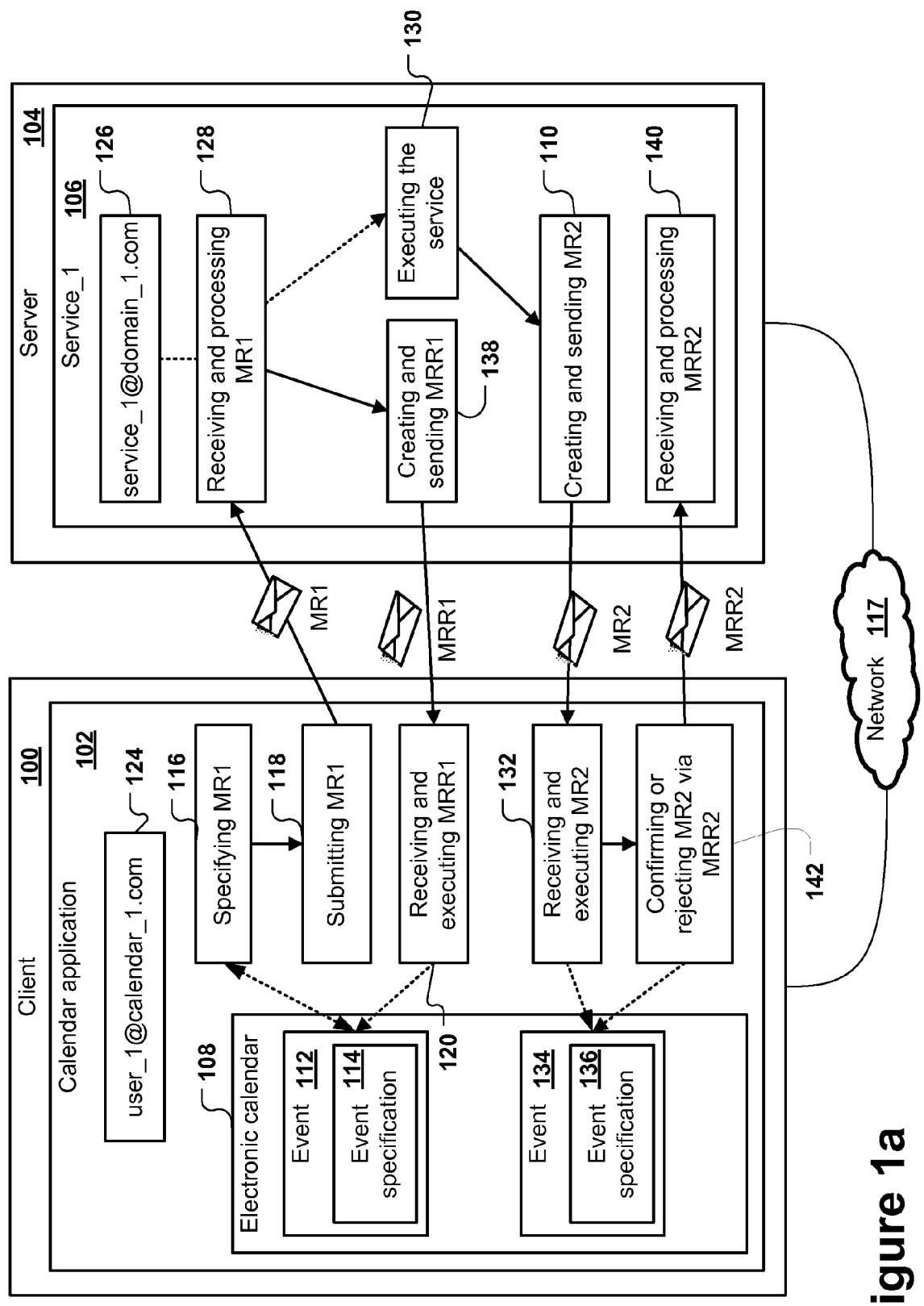
FIG. 1a illustrates a calendar application running on a client and the integration of a service via a meeting request e-mail according to the 'default updating strategy'.

In the following like elements are designated by identical reference numerals throughout the various embodiments.

FIG. 1a depicts the integration of a service 106 into calendar application 102 according to one embodiment of the invention. The embodiment of the invention depicted in figure is makes use of the 'default updating strategy' comprising the updating of the organizer's calendar via a first MRR e-mail (MRR1), in reply to a first MR e-mail (MR1) and a second MR e-mail (MR2).

The calendar application 102 is installed on a client machine 100, e.g. a computer, mobile phone or other processing device. The calendar application is operable to send and receive e-mails via the e-mail address 124 of a user of the calendar application. The client is operable to permanently or temporarily connect to a network 117, e.g. the Internet or the intranet of a company. The calendar application comprises an electronic calendar 108 containing events, e.g. event 112. Event specification 114 comprises data characterizing event 112, e.g. date and time of the begin and end of the event, the event location and additional information, e.g. on the type of the event (meeting, telephone conference, a trip) or the list of invited participants. The server 104 hosts the service 106, the service being represented by its service e-mail address 126.

In the following paragraphs, the integration of service 106 into the calendar application 102 will be described, the integration providing an update of the electronic calendar via a first MRR e-mail (MRR1) and a second MR e-mail (MR2).

Figure 1B:
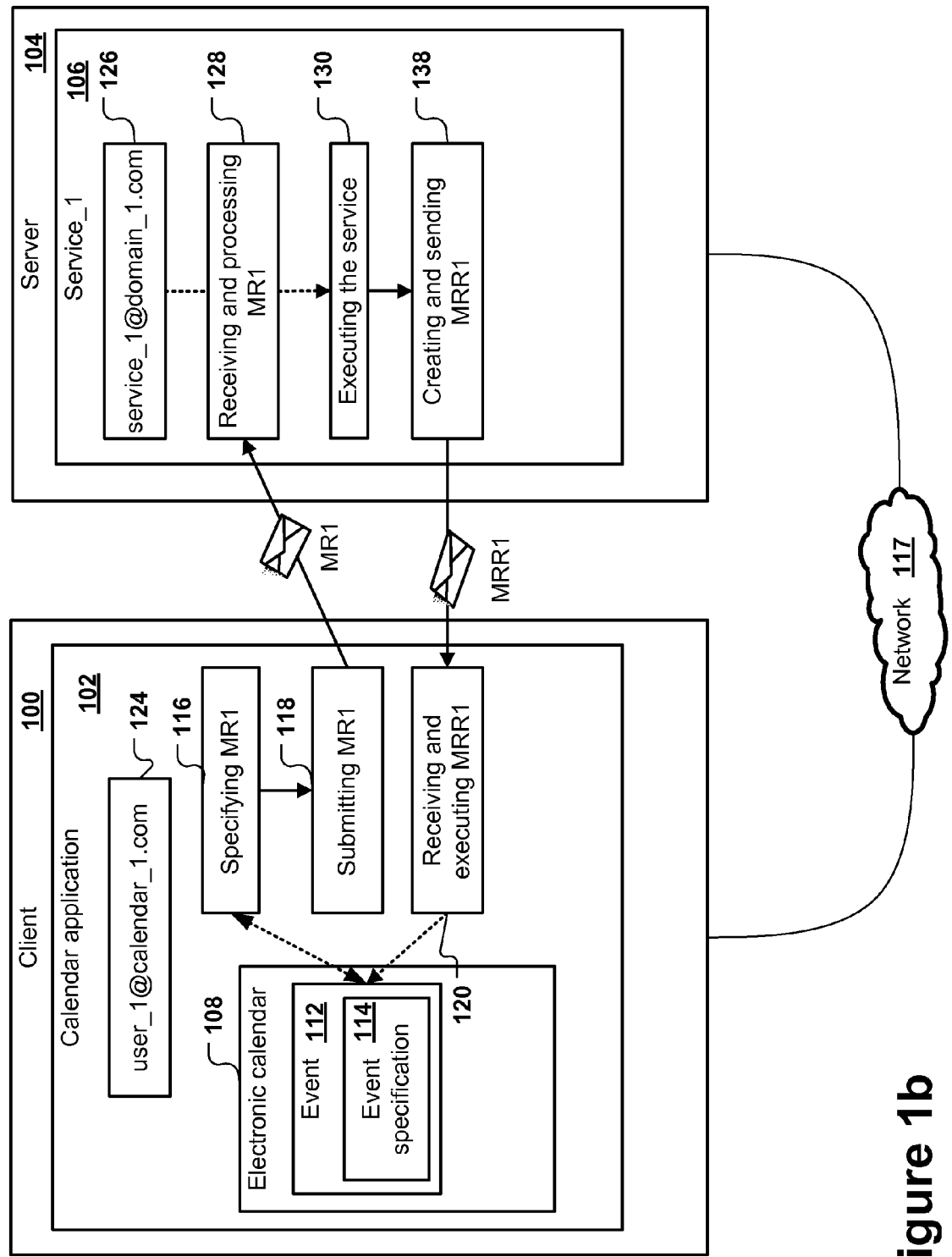
FIG. 1b illustrates a calendar application running on a client and the integration of a service via a meeting request e-mail according to the 'advanced updating strategy'.

At first, a meeting request e-mail MR1 is specified 116 by a user (meeting organizer) of the calendar application 102 or by a calendar implementation dependent software component 314 having read and write access to the calendar application. The process of specifying a meeting request e-mail automatically by software component 314 is described in detail in the paragraphs describing the embodiment of the invention depicted in FIG. 3. The specification 116 comprises the steps of specifying meeting request e-mail text fields required by the called service(s), e.g. the location, starting time and ending time, subject and text body field of the meeting request. Step 116 also comprises specifying the service e-mail address(es) to be used as input for the recipients field. FIG. 1 illustrates the case of calling only one single service 106 which is represented by the service e-mail address 126. According to other embodiments of the invention, the recipients field of the meeting request e-mail may also contain multiple service e-mail addresses.

After specifying 116 the first MR e-mail MR1, in the next step 118 a service request SR is submitted in the form of a meeting request e-mail MR1 and is sent from the sender address user_1@calendar_1.com 124 to the service e-mail address of service 106, service_1@domain_1.com 126. According to a preferred embodiment of the invention, the e-mail is transferred over an SMTP server (not shown). Server 104 monitors the mailbox corresponding to the service e-mail address 126 for incoming meeting request e-mails, which are also referred to as service requests (SR). After receiving the service request sent to 126, the server initiates the service 106.

The service 106 reads and processes 128 the data contained in all or in some of the fields of the meeting request e-mail MR1, the type of the read and evaluated e-mail fields being dependent on the service. The extracted data is used as input for the service. The service according to the depicted embodiment supports the 'default updating strategy' applicable for most current calendar applications. The service creates 138 and specifies a first MRR e-mail (MRR1) in response to the first MR e-mail (MR1). The MRR1 e-mail comprises only limited options for updating the organizer's calendar application. MRR1 is sent to the e-mail address 124. Upon receipt 120 of the MRR1 e-mail by the calendar application, the event 112 corresponding to the first MR e-mail MR1 is updated regarding the status of the service request (accepted/declined). The service may e.g. flag the MRR1 with 'accepted' in case the service is operable to process the service request, or flag the MRR1 e-mail with 'rejected' in case the request cannot be processed, e.g. because of a network error or because the input provided with MR1 does not meet the requirements of the service. The service 106 processes the data contained in the MR1 e-mail and executes 130 the service. The execution 130 of the service is decoupled (asynchronous) from the submission of the MRR1 e-mail. Step 130 may be executed immediately after sending the MRR1 e-mail or after a predefined period of time. The service may also be executed 130 repeatedly on a regular basis until a certain condition is fulfilled or may be triggered by any other event. Which kind of trigger is used by the service for its execution depends on the service. The execution 130 may involve the calling of one or more second order services (not shown) or the reading and/or writing of data from or to various storage media, e.g. a database. Depending on the results of step 130, a second meeting request MR2 is created and specified by the service which is finally sent 110 as a result to the e-mail address 124 of the user. After receiving 132 the second MR e-mail MR2 by the calendar application 102, a second event 134 is created according to the specifications of MR2, the specifications (time, location, subject, additional data within the text body) being the result of the execution 130 of the service. The user of the calendar application may confirm or decline 142 MR2 by submitting a second MRR e-mail MRR2 to the service. After receiving 140 MRR2, the server may execute additional processing steps depending on the acceptance status of MRR2 and on the implementation of the service 106.

For example, if the requested service 106 is a ticketing service for booking train tickets and the booking was successfully accomplished (there were free tickets available for the requested time and route), the MRR1 e-mail may have been marked by the service with the status 'accepted' resulting in the event 112 being flagged in the electronic calendar as 'confirmed'. The MR2 e-mail leading to the creation of a second event 134 in the electronic calendar may comprise a slightly different starting and ending time than event 112, in case there was no connection available matching the preferred departure and arrival time as specified in event 112 and MR1. The starting time of the MR2 e-mail is according to this use case scenario the actual departure time of the train and the ending time is the arrival time of the train. The MR2 e-mail may also comprise additional information regarding the purchase order and price of the train ticket, information on changing trains, the number of the reserved seats and the like. This additional data is contained in the second event 134 created by the calendar application upon receipt 132 of MRR2. In case there were no tickets left for sale, the ticketing service could have returned a decline via MRR1.

In case the calendar application supports the 'advanced updating strategy' (FIG. 1*b*), the MRR1 e-mail would have been created after the execution 130 of the service 106. Depending on the service, MRR1 may have been created only after a successful completion of the service yielding a particular kind of result. The MRR1 e-mail would comprise the results of the execution of the service and could differ regarding its specifications (starting time, ending time, location) from the specifications of MR1. As the calendar application 102 according to this scenario is able to update the calendar event 112 automatically, the additional information generated by the service would be added to event 112 automatically and the specification of event 112 would have been replaced in the update step by the event specifications (e.g. starting and ending time, location) of MRR1. In this case, the creation and submission 110 of a second MR e-mail is not required and no second event 134 is created.

Figure 2:
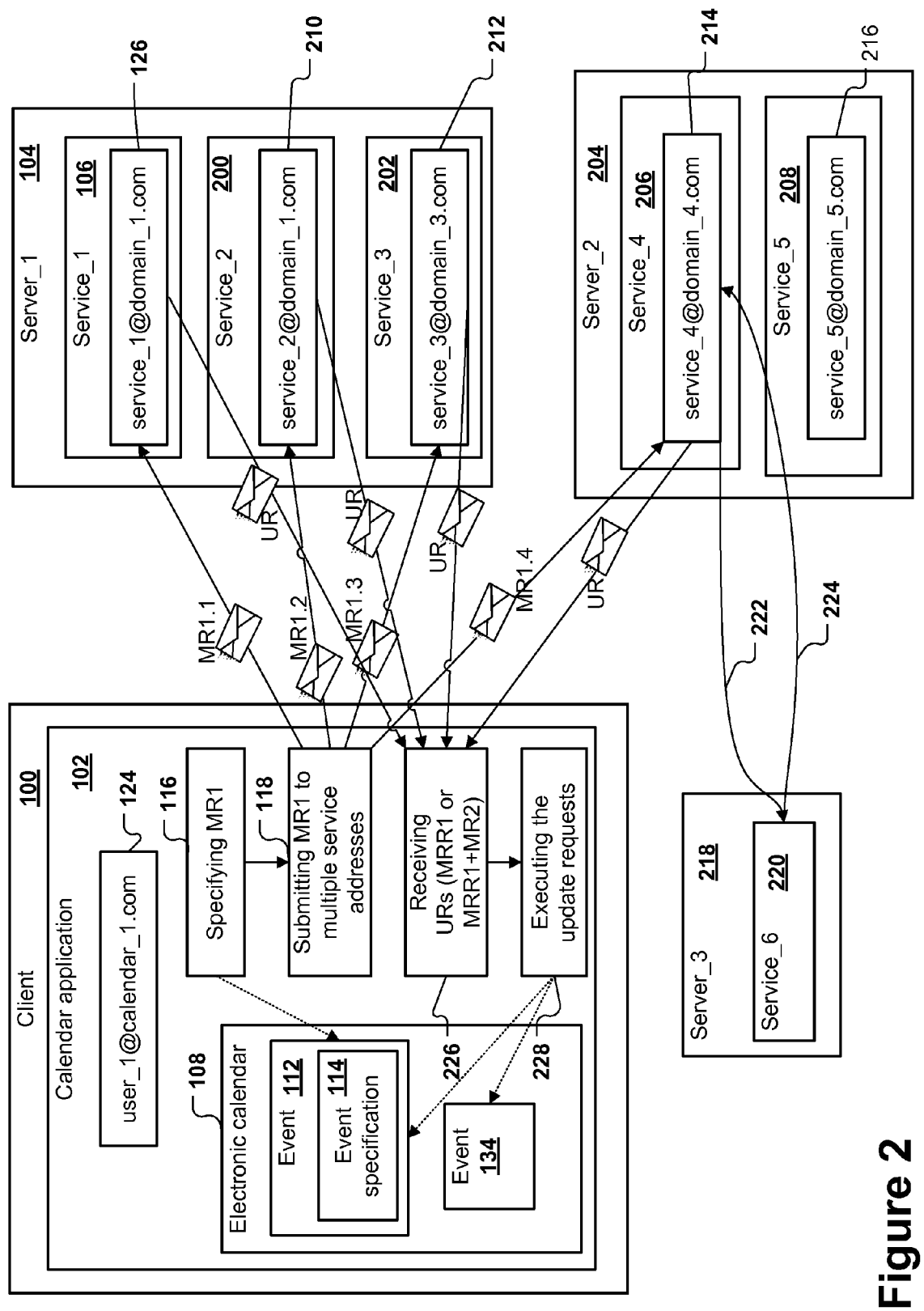
FIG. 2 illustrates a client running a calendar application, the calendar application calling multiple services hosted on multiple servers.

FIG. 2 illustrates further embodiments of the invention according to which multiple services are integrated into the calendar application 102. Multiple service requests are sent to multiple services, each service being represented by a particular service e-mail address. To simplify matters and to reduce the complexity of FIG. 2, the e-mails submitted from the services to the user's e-mail address of the calendar application according to the 'default updating strategy' (MRR1 and MR2) and the 'advanced updating strategy' (MRR1) are subsumed as update requests (UR). Depending on the updating strategy supported by the calendar, the results generated by the execution of the service may be used to update the existing event 112 or to specify one or multiple additional events 134.

At first, a meeting request is specified (116) by a user of the calendar application or by a software component having read and write access to the calendar application. The specification of the meeting request e-mail depicted in FIG. 2 differs from FIG. 1 only in so far as multiple service e-mail addresses are used as input for the recipients field. As a result of step 116, multiple meeting request e-mails are sent to multiple services 106, 200, 202 and 206, the services being represented by the service e-mail addresses 126, 210, 212 and 214. After the receipt of a meeting request e-mail sent to a service e-mail address representing a service, each server initiates the service corresponding to the service e-mail address receiving the request. Each service processes the received service request and extracts data required for the execution of the service. Service 206 in operation calls a second order service 220. The second order service may be called 222 via any currently available interface for data exchange, e.g. web services, remote procedure calls or via exchanging e-mails. The second order service returns 224 the result to the first order service 206 via the same or a different communication interface as used for receiving the second order request 222. Services 106, 210 and 212 do not call second order services. Each service 106, 200, 202, 204 returns the results generated by processing the service e-mail via a MRR1 e-mail comprising the full update information or via a MRR1 e-mail comprising only a limited set of update options in combination with a second MR e-mail MR2 comprising the full update information. Both update strategies (MRR1 or MRR1+MR2) are subsumed as update request (UR) which is returned to the sender's e-mail address 124. The calendar application receives 120 multiple update requests and updates 122 the event 112 in accordance with the content of the received meeting request response e-mails or creates additional events if the 'default updating strategy' is applied.

Figure 3:
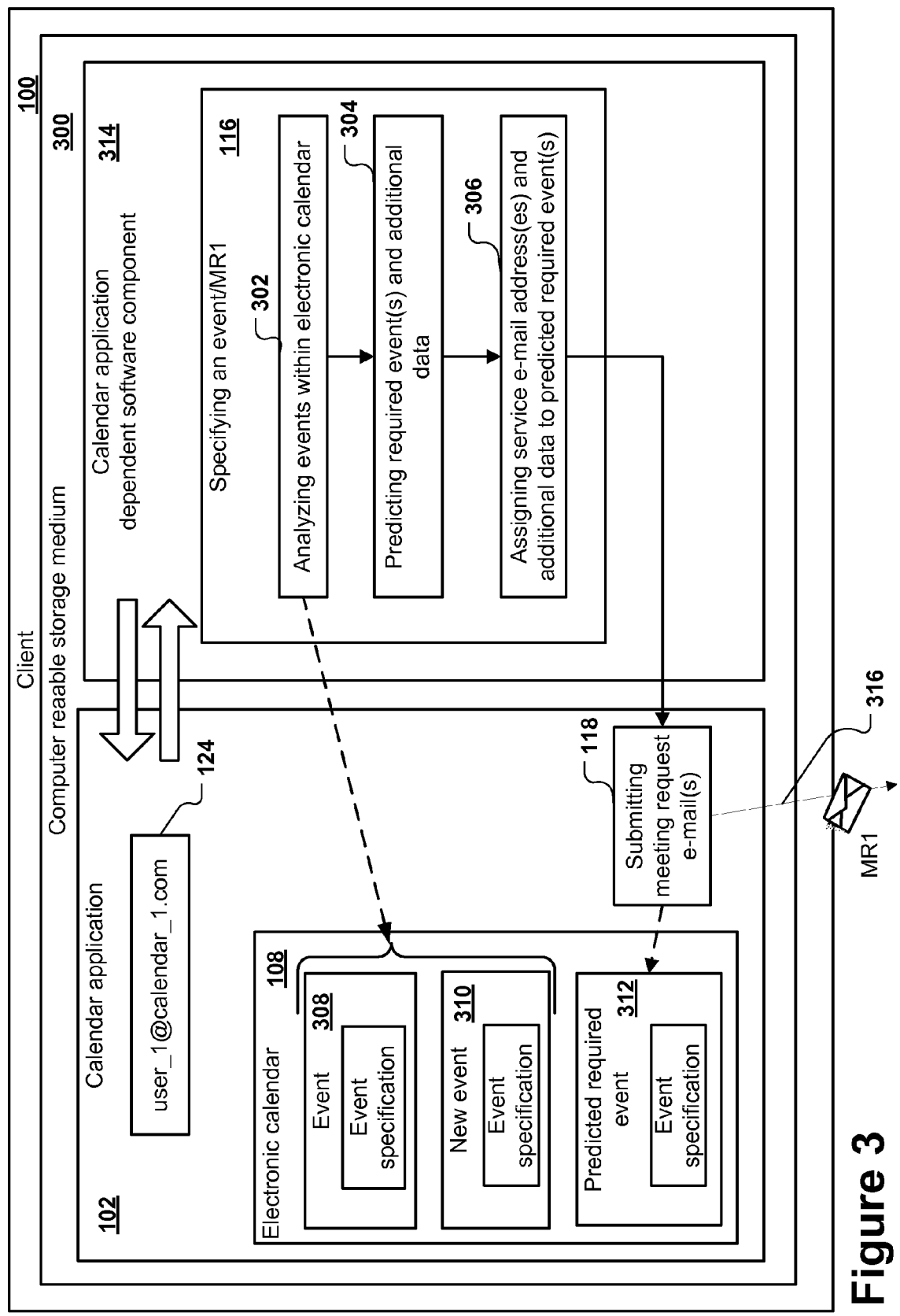
FIG. 3 illustrates a calendar application and a calendar application dependent software component being operable to predict required events according to the 'implicit required event prediction' approach.

FIG. 3 illustrates a computer readable storage medium 300 according to a further embodiment of the invention, the storage medium comprising instructions for a processor for executing a calendar application 102 and a calendar application dependent software component 314. The calendar application dependent software component in operation has read and write access to the data contained in the electronic calendar 108 of the calendar application. The calendar application is operable to submit service requests in the form of meeting request e-mails to one or multiple service e-mail addresses. The implementation of the calendar application dependent software component may depend on the operating system and depends on the type (Microsoft Outlook, Lotus Notes, Blackberry calendar) of the calendar application 102 installed on the client 100. The software component 314 can be implemented as 'plug-in' or 'add-in' for the calendar application. It can also be implemented as an independent service program being registered as event listener with a calendar event or as an independent service program searching the calendar application for new calendar entries on a regular basis.

The software component 314 in operation analyzes 302 the events contained in the electronic calendar 108 in order to predict events or actions necessary or useful for organizing the existing calendar events. The begin of the analysis may be triggered by entering a new event by the user or may be executed on a regular bases in predefined time intervals. The analysis may evaluate all events within a calendar or only a subset of events. The subset of events to be evaluated can be determined e.g. by the temporal proximity of an event 308 to a newly entered event 310 or any other criteria depending on the implementation of the software component 314.

According to a further embodiment of the invention, all events of the electronic calendar being in temporal proximity to a newly entered event 310 are used by the software component 314 for the prediction of required trip events. If, for example, event 308 is a business meeting in the office of an employee at 9.00 a.m. already existing within the calendar application and the newly entered event 310 is a business meeting in another town at 4 p.m., then the software component 314 predicts 304 that a trip is required in order to get from the office to the meeting in the other town in time. The software component 314 may execute several additional computation tasks depending on the implementation of 314. For example, the software component 314 could comprise the functionality of mapping tags of events to unequivocal addresses. If the meeting locations have been entered in the electronic calendar in the form of ambiguous names, e.g. 'Mike' or 'Mr. Miller', these location tags are replaced by their respective unequivocal addresses. In addition, or alternatively, the unequivocal addresses of the first and the second meeting place may be used by software component 314 to predict the best route, predict the route with the shortest travel time and to suggest a time of departure corresponding to the specified route. The prediction of the best route may also depend on user specific settings if available to the software component 314. Those settings may comprise data on the driving preferences of the user being participant of the trip sharing service. This additional data is then assigned to the predicted required event(s) 320. In step 306, the predicted required event is assigned one or multiple service e-mail addresses.

Based on the predicted departure time and route, the software component 314 initiates the creation of a meeting request e-mail, the e-mail comprising the start and ending time of the predicted required event. The meeting request e-mail may comprise additional data provided by the software component 314, and contains in its field of recipients the one or multiple service e-mail addresses assigned to the predicted required event by the software component.

According to one embodiment of the invention, the software component 314 in step 118 automatically initiates the submission of a service request via a meeting request e-mail to the service e-mail address. Depending on the implementation of the software component and the prediction result, step 306 may also comprise the prediction of multiple required events of different types. For example, software component 314 could have predicted the required event of a trip to get from one appointment to the next appointment, and could have in addition predicted the requirement of ordering a business gift for a particular meeting participant in time resulting in the submission of one meeting request e-mail to a trip sharing service to organize the trip and the submission of a second meeting request e-mail to a vendor of business gifts.

According to a further embodiment of the invention, the predicted required events are presented to the user of the calendar application before submission, they are not used to automatically specify and submit service requests to the services. The user has the option to check if he really wants to submit the predicted required event/service request, e.g. to the trip sharing service. In case the user accepts the prediction of the software component 314 and marks a predicted required event accordingly, the corresponding meeting request e-mail(s) are submitted to one or multiple services. This embodiment of the invention is particular beneficial if the predicted required events and actions often vary depending on multiple additional factors and an automated service request may therefore be inappropriate. In case the user feels ill and does not know in advance if he will be able to join a meeting scheduled in the following week, the user in this case has the option to delay his approval to the submission of the service requests until he is sure to be able to join the meeting and to make use of the trip sharing service.

According to a further invention, the calendar application dependent software component 314 is used to predict required trip events and to submit corresponding meeting requests to a trip sharing service via meeting request e-mails. The software component 314 predicts required trip events to get from one appointment to the next. The software component analyzes all events 308 being in temporal proximity to a particular event 310, e.g. an event that has just been added to the calendar application. The analysis in this case was initiated by the entry of the new event 310, but according to other embodiments, the analysis could be triggered by other events or be executed on a regular basis.

According to a typical use case scenario, a supplier of a remote service provides the software component 314 in the form of a downloadable calendar application dependent software component 314, e.g. a downloadable calendar application dependent software component, developed for a particular calendar application. e.g. Microsoft Outlook. After installation on the client machine, the plug-in in operation is capable to analyze the calendar application, to predict required events and actions and to send corresponding meeting request e-mails to the service. The service providing the downloadable plug-in may also provide means for entering user profile data or any other additional data to the plug-in, this data being used as additional information submitted in the service requests.

The software component 314 may have access to the user's profile data via accessing an online service related to the software component 314 or via the user entering his profile data to the software component 314 manually. This user profile data, if available, and context data of the analyzed events (e.g. time and location) is used in the analyzing step 302 to determine required trip events to get from the first event to the next.

The existing event 308 in the calendar may be a telephone conference on Monday, 9 a.m., having associated the location tag 'Work'. The second event may be a business meeting on 3 p.m. on the same day being assigned the location tag 'Dr. Millor Ltd.'. The plug-in predicts a required trip event to get from the employee's home to his office, the trip having an arrival time several minutes before the telephone conference starts. The time security margin can be specified by the user in the user profile, e.g. 15 minutes. In this case, the software component 314 will predict a required trip event from home to the employee's office with an arrival time 8.45 a.m. The predicted departure time is the earliest departure time acceptable for the user while the arrival time is the latest arrival time acceptable for the user. The latest acceptable arrival time cay be calculated by considering the starting time of a meeting in combination with a time margin specified e.g. in the user's profile data ensuring the user does not arrive late at a meeting. The predicted starting and arrival time therefore specify a time window within which the user is willing to travel. The software component may in addition predict further trip events required during the office day, e.g. in order to get from the office to the meeting scheduled at 3 p.m. in another town, or predict trip events required for spare time activities, e.g. to travel from the office to a movie theater. The prediction comprises the following steps:

1. map ambiguous tags, e.g. 'Mike', 'Home', 'Work', 'Movie theater' and the like contained in the location field of the analyzed calendar events to unequivocal, complete addresses comprising street name, house number and postal zip code. The mapping according to a further embodiment of the invention uses the local address book/contact list, the history of recently mapped tags and their corresponding address blocks or of mapping information stored in the users profile, if available.
2. Predict the route of the trip based on the complete start and destination address according to user defined criteria, e.g. the user defined security margin regarding the arrival time.
3. Assign additional, user specific data to the predicted trip if available, e.g. the user's preference to drive or act as co-driver.
4. Predict the travel time for the predicted route.
5. The predicted trips may now be submitted automatically to the trip sharing service via a meeting request e-mail created by the software component 314 to the service e-mail address of the trip sharing service. If the user has specified that the predicted required trip events should not be submitted to the corresponding service automatically, the predicted trips are collected in a list. The list of predicted trips is then presented to the user. The user may check the predicted trips for correctness of the prediction and may also alter some properties of the predicted trips, e.g. the time of departure or arrival. The user may also delete predicted trips. After checking and optionally editing the predicted trips, the specifications of the predicted trips are used by the software component 314 to create meeting request e-mails sent to the service address of the trip sharing service and the meeting request e-mails are submitted. The user may at any time deactivate the manual approval step and switch to automated submission of the predicted required trip events as service request to the trip sharing service if the quality of the predictions is sufficient.

6. The service request is then processed by the remote trip sharing service as described in detail for the embodiment depicted in FIG. 6. In summary, the trip sharing service searches for users intending to travel the same route or the same part of the route at almost the same time as specified for the trip contained in the service request. The profile of the users and potential trip accompanies are in addition checked for compatibility with the specifications of the user sending the request.

7. In case the trip sharing service was able to detect one or multiple user profiles associated to matching trip plans and preferences, the user receives a list of matching users and associated contact data via a meeting request response e-mail, the profiles in that list being ordered according to the number and relevance of the matching profile and trip properties. The user receiving the list in the e-mail may contact one or multiple potential trip accompanies listed in this meeting request response e-mail.

Figure 4:
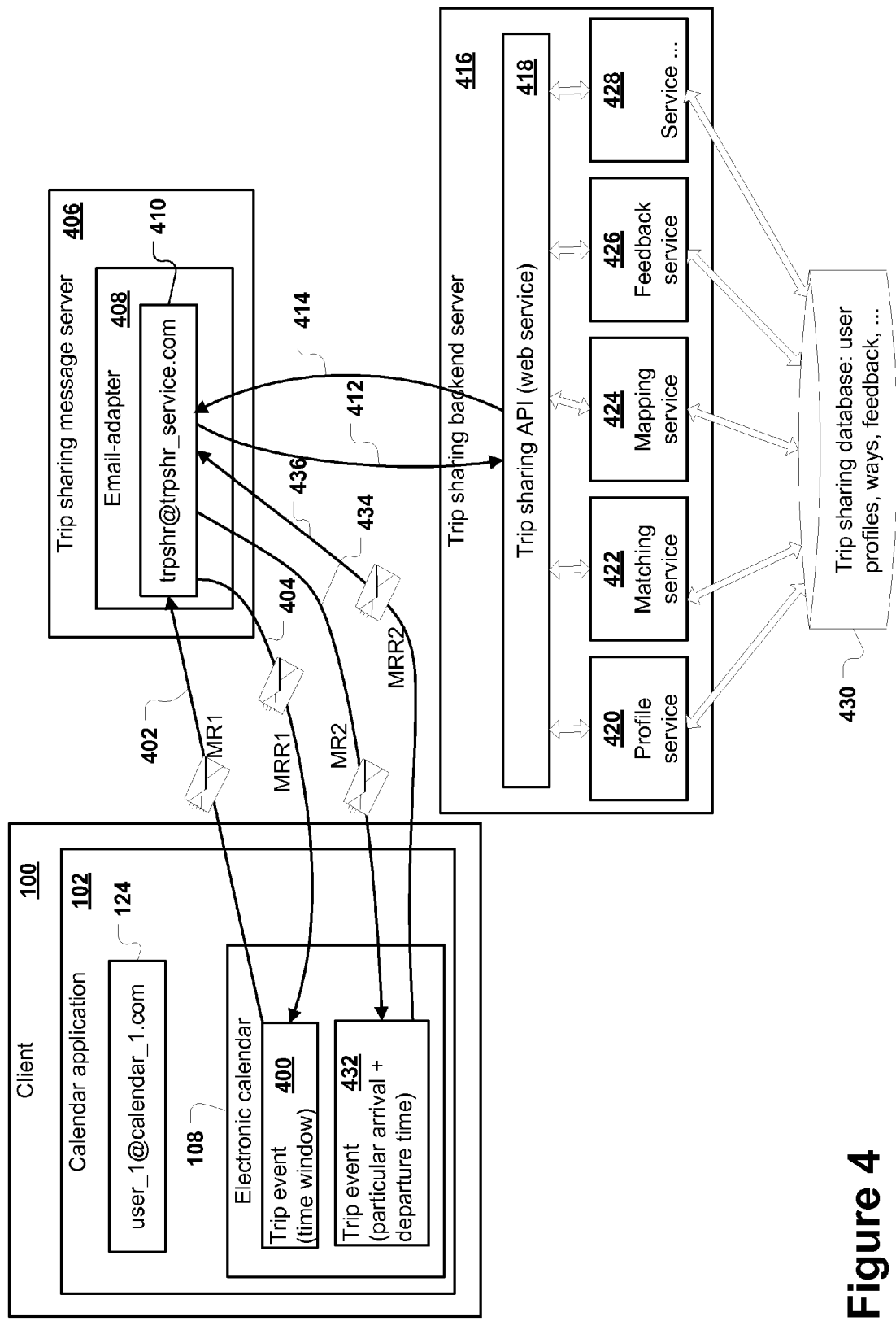
FIG. 4 illustrates the service architecture of a trip sharing service comprising a message server and a backend server, the message server being called by a client.

FIG. 4 depicts the service architecture of a trip sharing service according to a further embodiment of the invention, wherein the trip sharing service comprises multiple service modules 420-428 hosted on a backend server 426, the backend server being accessible via a trip sharing web service API 418.

In operation, a trip event 400 is specified in the form of a meeting request e-mail comprising departure and arrival time of the trip, starting point and destination and additional parameters. The trip event is either specified by the user of the calendar application 102 manually, is predicted as required event by the software component 314 (not shown) or is predicted by another remote service (not shown). The starting and arrival times specified in the meeting request e-mail specify a time window during which the user is willing to travel. The created meeting request e-mail corresponding to the trip event is sent by the calendar application from the e-mail address 124 of the user to the service e-mail address 410. The service represented by this service e-mail address is not the trip sharing service itself but rather a software component acting as Email-adapter. The Email-adapter has the function of receiving service request e-mails, extracting all information specifying a trip event being required by the trip sharing service, and creating one or multiple new requests 414 comprising this extracted data. According to a preferred embodiment, the Email-adapter 408 transforms the service request 402 received in the form of a meeting request e-mail to a second order service request 412 comprising the request of one or multiple web services 420-428 via the trip sharing API 418. The API and the services 420-428 are hosted on a trip sharing backend server 416. One or multiple of the services 420-428 have access to a trip sharing database 430 comprising user profiles, ways, feedback information provided by trip sharing service users and other trip sharing related information.

Figure 5:
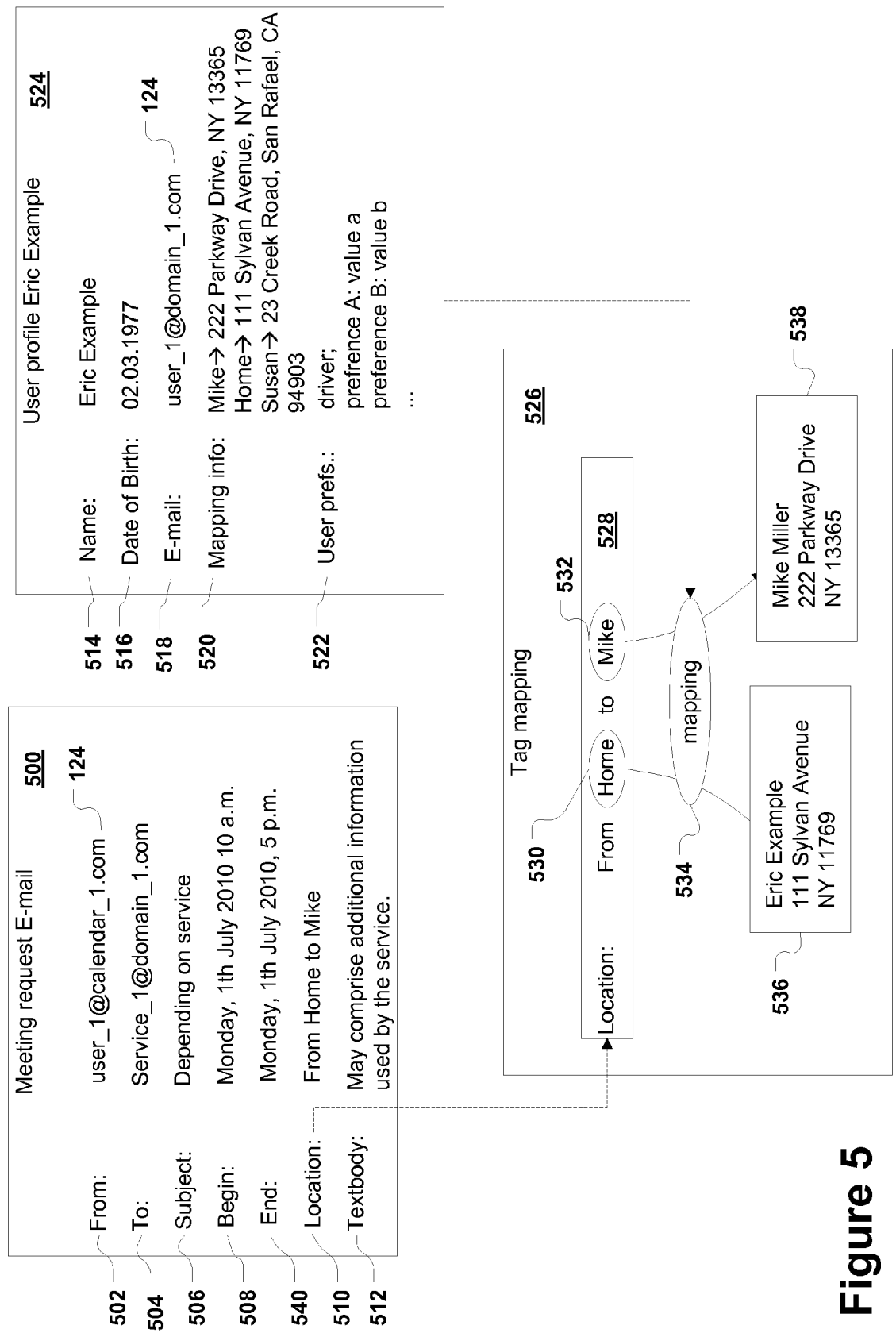
FIG. 5 depicts the mapping of tags contained within a meeting request e-mail to unequivocal addresses as specified in a user profile.

A service request 402 via a meeting request e-mail MR1 is sent to the Email-adapter service 408 located on the trip sharing message server 406 as depicted in FIG. 5. The e-mail comprises the sender's e-mail address 502, the recipient's e-mail address 504, the earliest possible starting time of the trip 508, the latest possible arrival time of the trip (540) and data within the location field which will be used to predict the route of the trip (FIG. 5). The time information (508) and (540) specify a time window during which the user is willing to travel. The meeting request e-mail MR1 may in addition comprise trip related information in other fields 506, 512. In case the 'default updating strategy' is applied as depicted in FIG. 4, a MRR1 e-mail 404 is submitted to the sender's e-mail address comprising the information that the service 408 has accepted the service request. In case of network problems or in case the data contained in the MR1 e-mail cannot be processed by the service appropriately (the e-mail could comprise ambiguous or unknown location tags or could contain invalid required data), the MRR1 e-mail could contain information on the source of the problem. Although this additional information can not be added to the corresponding calendar event in the electronic calendar of the organizer automatically, the additional information can be read by the organizer and used to modify his meeting request e-mail MR1 accordingly, e.g. check the erroneous tag for spelling errors.

All relevant information is extracted from the meeting request e-mail 402 and used to specify the second order service request 412. The E-mail adapter 408 at first invokes a profile service 420 for assigning a user profile to the service request. The profile service has access to the database 430 comprising, among other data, also user profiles. A user profile 524 may comprise multiple attributes, e.g. the real name of the user 514, his date of birth 516, his e-mail address 518, and may also comprise mapping information 520 and additional parameters 522 specifying the trip preferences of the user.

The profile service 420 searches for the user profile stored in 430, the user profile being associated to an e-mail address 124 being identical to the sender's e-mail address 124. The data comprised in a meeting request e-mail sent to the trip sharing service and comprised in each user profile is illustrated in detail in FIG. 5. If an appropriate user profile 524 was found by the profile service, mapping information 520 contained in this user profile is retrieved and used during the execution of the mapping service 424. The mapping service maps ambiguous tags 530, 532 within the location field of the meeting request e-mails to unequivocal addresses 536, 538 (FIG. 5). There exist generally available tags, e.g. 'Home' or 'Work', but also user-specific tags, e.g. 'Mike' or 'Supermarket'. These tags are automatically replaced by user specific, complete addresses as specified in the mapping schema 520 of the user profile. The two addresses 536 and 538 define the starting point and destination of the trip. In addition, external services such as Google Maps may be used to derive the GPS coordinates of those addresses or to derive street maps depicting the route of the shared trip.

According to a further embodiment of the invention, the meeting request e-mail MR1 402 may comprise additional mapping information 512 overwriting the tag mapping schema 516 of the user profile. For example, the tag 'Work' may be mapped according to the specification in a user's profile to a particular address. Three days in a year the employee works in a different dependence of his company. Instead of changing the mapping information of his user profile, the employee during those three days may simply add additional mapping information to his service requests sent to the trip sharing service, the additional information mapping 'Work' to a different address. After retrieving the unequivocal addresses for the location tags, a route is calculated to get by car from the starting point to the destination. According to a further embodiment of the invention, the route calculation may be executed by a third party service, e.g. Google maps. The route can be used by the service to calculate the time the trip via the predicted route will probably take.

After the execution 534 of the mapping service 424, a matching service 422 is executed. Based on the calculated route and additional parameters 518 contained in the user's profile or the meeting request e-mail 500, the mapping service of the trip sharing service searches for users having trip preferences being compatible with the preferences specified in the e-mail 500 and the sender's user profile 524 and who plan to travel the same route or a part of the same route within the time window defined by the starting time (the earliest acceptable starting time for the user) and the arrival time (the latest acceptable arrival time for the user) as specified in e-mail 402. In addition, the matching service checks if the profile of the user submitting the service request 402 and the profile of a potential trip accompany match regarding their trip specifications and preferences 522, e.g. regarding the driver/co-driver preferences. In case one or multiple matching user profiles are detected in the database 430, the best matching profiles are assigned automatically to the trip. In case the 'default updating strategy' is applicable as depicted in FIG. 4, a second MR e-mail MR2 is created. The second MR e-mail comprises the e-mail addresses of the matching user profiles in the recipients field. While the starting and ending time of the MR1 e-mail specified a time window within which the user sending the service request was willing to travel, the starting and ending time of the MR2 e-mail representing departure and arrival times of a particular trip specified according to the matching of user profiles and trip specifications. The MR2 e-mail specifying a particular trip event with one or multiple trip accompanies comprises in its text body e.g. additional data on the trip. The MR2 e-mail is sent to the user's e-mail address 124 and to the e-mail addresses of the other potential trip accompanies detected by the matching service 422. The receipt of the MR2 e-mail results in the automatic creation of a trip event 432 in the electronic calendar 108 of the user and of the electronic calendars of the other invited participants. Each participant may accept or decline the suggested trip event as specified by MR2, resulting in an update of all created trip events according to MR2. The acceptance or decline of the proposed trip event 432 by each of the invited participants results in each case in the automated submission of a corresponding MRR2 e-mail to the trip sharing service. The receipt of the MRR2 e-mail by the service 408 may result in appropriate additional processing steps, e.g. marking the corresponding trip entry 600 in database 430 as 'accepted' via the trip sharing API 418.

According to a further embodiment of the invention, the user profile database of the trip sharing service is operable to be populated via an automated import of user profiles of various social networks, e.g. Facebook, via an import of lists of employee profiles of a company, via an import of LDAP directories or an import of user profiles stored according to any other data format. The import is executed by software modules being operable to read the user profiles from a source data repository and to store them to the user profile database 430 of the trip sharing service. This feature is advantageous, as the user specific settings used in the matching procedure of the trip sharing service may comprise the option for a preferential matching of users being member of the same social network or company. If a company uses the trip sharing service to reduce expenses, preferentially employees from the same company will be matched by the matching service 422. Only in case there are car seats left which cannot be assigned to employees of the same company, persons outside the company may be accepted by the matching service in this scenario.

Figure 6:
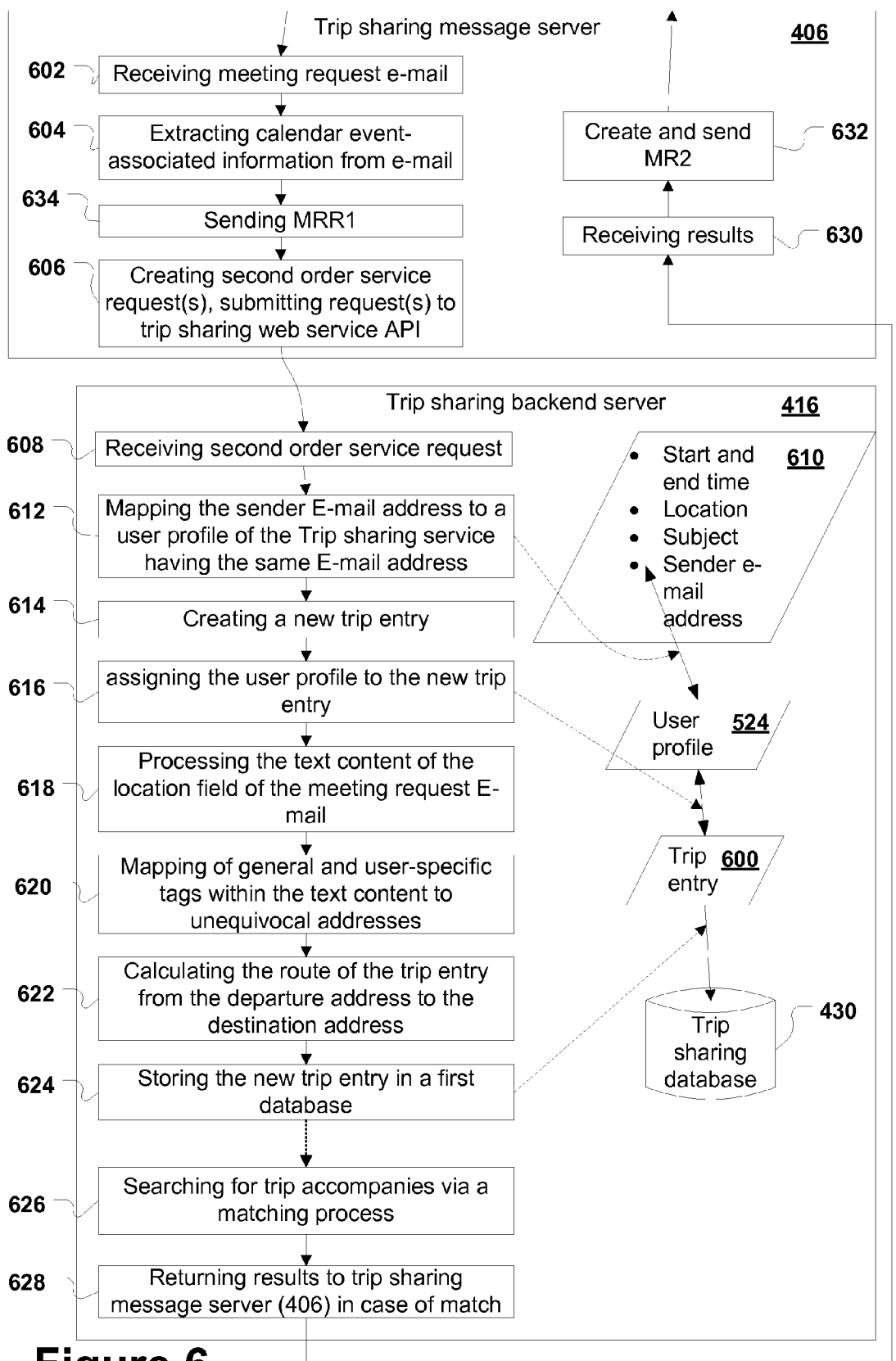
FIG. 6 is a flow chart illustrating the steps of predicting required routes by a trip sharing service.

FIG. 6 is a flow chart illustrating the steps executed by the profile, mapping and matching service of the trip sharing service according to a further embodiment of the trip sharing service in greater detail.

Steps executed on the trip sharing message server 406:
1. Receiving 602 a meeting request e-mail sent to the trip sharing service e-mail address 410 from a sender's e-mail address 124, the e-mail comprising start location, destination, earliest departure time, latest arrival time and location tags or a route tag. The meeting request may in addition comprise user specific settings for a planned trip and additional user preferences.
2. Initiation of the Email-adapter, the Email-adapter extracting 604 sender e-mail address 124 and additional required data 610 from the received e-mail.
3. Sending 634 an MRR1 e-mail as confirmation to the sender's e-mail address 124.
4. Creating 606 second order service requests, the second order service requests comprising the data extracted from the received meeting request e-mail required by the services on the trip sharing backend server for execution. Submitting the second order service requests to a profile service, a mapping service and a matching service, each service being hosted on the trip sharing backend server and being accessible via a web service API.

Steps executed on the trip sharing backend server 416:
1. Receiving 608 the second order service request(s).
2. Mapping 612 the sender's e-mail address to a user profile of the trip service having the same e-mail address, the mapping being executed by the profiles service.
3. Creating 614 a new trip entry, wherein the trip entry is a data object representing a trip.
4. Assigning 616 the user profile 524 to the new trip entry 600.
5. Processing 618 the text content of at least the location field by the mapping service.
6. Mapping 620 of general and user-specific location or route tags within the text content to unequivocal addresses or routes.
7. Calculating 622 the route of the trip entry from the departure address to the destination address in case location tags were given.
8. Storing 624 the trip entry to the trip sharing service database 430.
9. Searching 626 for one or multiple appropriate trip accompanies via a matching of user profile preferences and trip, wherein the matching checks at least the congruency of driving preferences (driver/co-driver) and trip preferences (matching time windows and routes). The search 626 does not necessarily follow the receipt 608 of the second order service request and the subsequent steps directly. Rather, it is possible that step 626 is executed on a regular basis or upon the receipt of other trip sharing service requests. The search 626 may therefore be executed asynchronously from the first call of the trip sharing service by the user.
10. Returning the result in the form of a list of potential trip accompanies to the trip service message server.

Steps executed on the trip sharing message server 406:
1. Receiving 630 the results generated by the services hosted on the trip sharing backend server 416:
2. Creating 632 a meeting request e-mail MR2 comprising the results data of step 630.

3. Sending 634 the meeting request e-mail MR2 to the sender's e-mail address 124.
4. The client may accept or decline MR2, thereby submitting a MRR2 e-mail to the service and other event participants.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

ABBREVIATIONS

API Application Programming Interface
LDAP Lightweight Directory Access Protocol
MR Meeting Request
MRR meeting request response
UR Update Request
SR Service Request
LAN Local Area Network
WAN Wide Area Network

LIST OF REFERENCE NUMERALS

100 client machine
102 calendar application
104 server
106 service
108 electronic calendar
110 step
112 event
114 event specification
116 step
117 network
118 step
120 step
122 step
124 user's e-mail address
126 service e-mail address
128 step
130 step
132 step
134 event
136 event specification
138 step
140 step
142 step
200 service
202 service
204 server
206 service
208 service
210 service e-mail address
212 service e-mail address
214 service e-mail address
216 service e-mail address
218 server
220 service
222 second order request
224 second order response
226 step
228 step
300 computer readable storage medium
302 step
304 step
306 step
308 event
310 new event
312 predicted required event
314 calendar application dependent software component
316 MR1 e-mail
400 trip event
402 MR1 e-mail
404 MRR1 e-mail
406 trip sharing message server
408 e-mail adapter (service)
410 service e-mail address
412 second order service request
414 second order service response
416 Trip sharing backend server
418 Trip sharing API (web service)
420 service
422 service
424 service
426 service
428 service
430 trip sharing database
432 trip event
434 MR2 e-mail
436 MRR2 e-mail
500 meeting request e-mail
502 e-mail sender field
504 recipients field
506 subject field
508 starting time field
510 location field
512 e-mail text body
514 additional user datum
516 additional user datum
518 unique user e-mail address
520 tag mapping specifications
522 user preferences
524 user profile
526 tag mapping process
528 content of location e-mail field
530 location tag
532 location tag
534 tag mapping step
536 unequivocal address
538 unequivocal address
540 ending time
600 trip entry
602 step
604 step
606 step
608 step
610 calendar event associated information
612 step
620 step
622 step
624 step
626 step
628 step
630 step
632 step
634 step

What is claimed is:

1. A computer implemented method for integrating services in a calendar application displayed on a computer, comprising:

specifying an event within an electronic calendar of a calendar application on the computer, the calendar application configured to send and receive e-mails, wherein the event is being taken from the group consisting of singular events and recurring events, the recurring events being events with a certain recurrence pattern, the events being data objects in an electronic calendar of the calendar application;

analyzing the event and the recurring events in the electronic calendar;

predicting required events based on a temporal proximity to the event and the recurring events in the electronic calendar;

submitting a service request to a service, the service request comprising the specification of the event, the service request being sent in the form of an e-mail to a service e-mail address by the calendar application, wherein the service e-mail address represents the service, and wherein the e-mail is a meeting request e-mail;

receiving, from a processor, the service request sent to the service e-mail address of the service being represented by the service e-mail address;

determining, by the processor, if the service is operable to process the service request based on network connectivity and compatibility between the service and the meeting request e-mail;

flagging the meeting request e-mail as acceptable if the service is determined to be operable and flagging the meeting request e-mail as rejected if the service is determined to be inoperable;

executing, by the processor, the service after the delivery of the service request e-mail to the service e-mail address of the service, wherein the execution is decoupled from submission of the meeting request e-mail;

returning an update request by the service, the update request comprising a result generated by the requested service, the update request being an e-mail sent to the e-mail address used by the calendar application for sending the service request, the update request e-mail being a meeting request response e-mail or a second meeting request e-mail;

receiving, from the processor, the update request from the requested service by the calendar application; and executing, by the processor, the received update request by the calendar application, resulting in an automatic update of the electronic calendar of the calendar application;

wherein the requested service is configured to map general and user-specific tags within text of the service request e-mail to unequivocal addresses, the mapping information being derived from the set consisting of tag mapping information of a user profile and tag mapping information contained within the service request e-mail, wherein the user profile corresponds to the user of the calendar application sending the service request.

2. The computer implemented method according to claim 1, comprising:

submitting multiple service requests to multiple services, each service request comprising the specifications of the event, each service request being sent by the calendar application in the form of an e-mail to a service e-mail address representing the service, wherein the e-mail is a meeting request e-mail;

receiving, from the processor, the update requests from the multiple requested services by the calendar application; and executing, by the processor, the received update requests by the calendar application, resulting in an automatic update of the electronic calendar of the calendar application.

3. A computer implemented method comprising:

receiving, from a processor, a service request sent to a service e-mail address of a service, the service being represented by the service e-mail address, the service request comprising specifications of an event within an electronic calendar of a calendar application, the service request being a meeting request e-mail, the service request being sent by a calendar application configured to send and receive e-mails;

determining, by the processor, if the service is operable to process the service request based on network connectivity and compatibility between the service and the meeting request e-mail;

flagging the meeting request e-mail as acceptable if the service is determined to be operable and flagging the meeting request e-mail as rejected if the service is determined to be inoperable;

executing, by the processor, the service, the execution being initiated after the delivery of the service request e-mail to the service e-mail address of the service, wherein the execution is decoupled from submission of the meeting request e-mail; and returning an update request by the service, the update request comprising a result generated by the requested service, the update request being an e-mail sent to the e-mail address used by the calendar application for sending the service request, the update request e-mail being a meeting request response e-mail or a second meeting request e-mail, the update request being adapted to automatically update the electronic calendar of the calendar application receiving the update request;

wherein the requested service is configured to map general and user-specific tags within text of the service request e-mail to unequivocal addresses, the mapping information being derived from the set consisting of tag mapping information of a user profile and tag mapping information contained within the service request e-mail, wherein the user profile corresponds to the user of the calendar application sending the service request.

4. The computer implemented method according to claim 3, wherein the specifications of the event within the service request have been explicitly specified by a user of the calendar application sending the service request, wherein the user explicitly defines at least time and date of the event and selects the service e-mail address representing the service.

5. The computer implemented method according to claim 3, wherein the user profiles available for the service are derived from the group consisting of social communities, employee profiles of companies, LDAP directories and user profile lists.

6. The computer implemented method according to claim 3, wherein the meeting request e-mail comprises at least one tag representing the place of departure and one tag representing the destination, the tags being contained within the location field of the meeting request e-mail, wherein the requested service is a trip sharing service, the execution of the trip sharing service comprising the steps of:

extracting calendar event-associated information from the service request, the calendar event-associated information comprising at least the sender e-mail address, the location, date and time of the calendar event), mapping the sender e-mail address to a user profile of the trip sharing service having the same e-mail address, creating a new trip entry, assigning the user profile to the new trip entry processing the text content of the location field of the meeting request e-mail, the processing comprising the mapping of general and user-specific tags within the text content to unequivocal addresses, the user-specific mapping information being derived from the user-profile, wherein the departure and destination addresses are derived from the departure and destination tags within the location field of the meeting request e-mail, wherein the starting time and the ending time the meeting-request, specify a time window within which the user sending the meeting request e-mail is prepared to take the trip, wherein the route from the departure address to the destination address is calculated, storing the new trip entry in a first database, and searching for appropriate trip accompanies, the appropriateness depending on matching parameters specified in the user profile and the text of the meeting-request e-mail, the matching parameters comprising at least the driver/co-driver preference of the user.

7. The computer implemented method according to claim 6, wherein the meeting request e-mail comprises at least one tag representing an unequivocal route.

8. A non-transitory computer-readable storage medium encoded with instructions configured to be executed by a processor, the instructions which, when executed by the processor, cause the performance of a method, comprising:

receiving a service request sent to a service e-mail address of a service, the service being represented by the service e-mail address, the service request comprising specifications of an event within an electronic calendar of a calendar application, the service request being a meeting request e-mail, the service request being sent by a calendar application being operable to send and receive e-mails;

determining if the service is operable to process the service request based on network connectivity and compatibility between the service and the meeting request e-mail;

flagging the meeting request e-mail as acceptable if the service is determined to be operable and flagging the meeting request e-mail as rejected if the service is determined to be inoperable;

executing the service, the execution being initiated after the delivery of the service request e-mail to the service e-mail address of the service, wherein the execution is decoupled from submission of the meeting request e-mail; and returning an update request by the service, the update request comprising a result generated by the requested service, the update request being an e-mail sent to the e-mail address used by the calendar application for sending the service request, the update request e-mail being a meeting request response e-mail or a second meeting request e-mail, the update request being adapted to automatically update the electronic calendar of the calendar application receiving the update request;

wherein the requested service is configured to map general and user-specific tags within text of the service request e-mail to unequivocal addresses, the mapping information being derived from the set consisting of tag mapping information of a user profile and tag mapping information contained within the service request e-mail, wherein the user profile corresponds to the user of the calendar application sending the service request.

9. The medium according to claim 8, wherein the specifications of the event within the service request have been explicitly specified by a user of the calendar application sending the service request, wherein the user explicitly defines at least time and date of the event and selects the service e-mail address representing the service.

10. The medium according to claim 8, wherein the user profiles available for the service are derived from the group consisting of social communities, employee profiles of companies, LDAP directories and user profile lists.

11. The medium according to claim 8, wherein the meeting request e-mail comprises at least one tag representing the place of departure and one tag representing the destination, the tags being contained within the location field of the meeting request e-mail, wherein the requested service is a trip sharing service, the execution of the trip sharing service comprising the steps of:

extracting calendar event-associated information from the service request, the calendar event-associated information comprising at least the sender e-mail address, the location, date and time of the calendar event), mapping the sender e-mail address to a user profile of the trip sharing service having the same e-mail address, creating a new trip entry, assigning the user profile to the new trip entry processing the text content of the location field of the meeting request e-mail, the processing comprising the mapping of general and user-specific tags within the text content to unequivocal addresses, the user-specific mapping information being derived from the user-profile, wherein the departure and destination addresses are derived from the departure and destination tags within the location field of the meeting request e-mail, wherein the starting time and the ending time the meeting-request, specify a time window within which the user sending the meeting request e-mail is prepared to take the trip, wherein the route from the departure address to the destination address is calculated, storing the new trip entry in a first database, and searching for appropriate trip accompanies, the appropriateness depending on matching parameters specified in the user profile and the text of the meeting-request e-mail, the matching parameters comprising at least the driver/co-driver preference of the user.

12. The medium according to claim 11, wherein the meeting request e-mail comprises at least one tag representing an unequivocal route.

13. A non-transitory computer-readable storage medium encoded with instructions configured to be executed by a processor, the instructions which, when executed by the processor, cause the performance of a method, comprising:

specifying an event within an electronic calendar of a calendar application, the calendar application configured to send and receive e-mails, wherein the event is being taken from the group consisting of singular events and recurring events, the recurring events being events with a certain recurrence pattern, the events being data objects in an electronic calendar of the calendar application;

analyzing the event and the recurring events in the electronic calendar;

predicting required events based on a temporal proximity to the event and the recurring events in the electronic calendar;

submitting a service request to a service, the service request comprising the specification of the event, the service request being sent in the form of an e-mail to a service e-mail address by the calendar application, wherein the service e-mail address represents the service, and wherein the e-mail is a meeting request e-mail;

receiving the service request sent to the service e-mail address of the service being represented by the service e-mail address;

determining, by the processor, if the service is operable to process the service request based on network connectivity and compatibility between the service and the meeting request email;

flagging the meeting request e-mail as acceptable if the service is determined to be operable and flagging the meeting request e-mail as rejected if the service is determined to be inoperable;

executing the service after the delivery of the service request e-mail to the service e-mail address of the service, wherein the execution is decoupled from submission of the meeting request e-mail;

returning an update request by the service, the update request comprising a result generated by the requested service, the update request being an e-mail sent to the e-mail address used by the calendar application for sending the service request, the update request e-mail being a meeting request response e-mail or a second meeting request e-mail;

receiving the update request from the requested service by the calendar application; and executing the received update request by the calendar application, resulting in an automatic update of the electronic calendar of the calendar application;

wherein the requested service is configured to map general and user-specific tags within text of the service request e-mail to unequivocal addresses, the mapping information being derived from the set consisting of tag mapping information of a user profile and tag mapping information contained within the service request e-mail, wherein the user profile corresponds to the user of the calendar application sending the service request.

14. The medium according to claim 13, comprising:

submitting multiple service requests to multiple services, each service request comprising the specifications of the event, each service request being sent by the calendar application in the form of an e-mail to a service e-mail address representing the service, wherein the e-mail is a meeting request e-mail;

receiving the update requests from the multiple requested services by the calendar application; and executing the received update requests by the calendar application, resulting in an automatic update of the electronic calendar of the calendar application.

* * * * *